US008677347B2

(12) United States Patent
Tamura

(10) Patent No.: US 8,677,347 B2
(45) Date of Patent: *Mar. 18, 2014

(54) DEVICE MANAGEMENT APPARATUS, CLIENT APPARATUS, AND DEVICE MANAGEMENT METHOD

(75) Inventor: Yuu Tamura, Yokohama (JP)

(73) Assignee: Canon Kabushiki Kaisha (JP)

( * ) Notice: Subject to any disclaimer, the term of this patent is extended or adjusted under 35 U.S.C. 154(b) by 112 days.

This patent is subject to a terminal disclaimer.

(21) Appl. No.: 13/284,121

(22) Filed: Oct. 28, 2011

(65) Prior Publication Data

US 2012/0047500 A1 Feb. 23, 2012

Related U.S. Application Data

(63) Continuation of application No. 11/466,570, filed on Aug. 23, 2006, now Pat. No. 8,074,216.

(30) Foreign Application Priority Data

Aug. 26, 2005 (JP) ................................. 2005-246426

(51) Int. Cl.
*G06F 9/45* (2006.01)
(52) U.S. Cl.
USPC .......................................................... 717/174
(58) Field of Classification Search
USPC .......................................................... 717/174
See application file for complete search history.

(56) References Cited

U.S. PATENT DOCUMENTS

| 6,967,736 | B2 | 11/2005 | Simpson et al. |
| 7,209,250 | B2 | 4/2007 | Nakao |
| 7,787,863 | B2 | 8/2010 | van de Groenendaal |
| 8,074,216 | B2 * | 12/2011 | Tamura .......................... 717/174 |
| 8,117,612 | B2 * | 2/2012 | Flegg et al. ..................... 717/178 |
| 8,176,503 | B2 * | 5/2012 | Ford et al. ...................... 719/327 |
| 2003/0014529 | A1 | 1/2003 | Simpson et al. |
| 2003/0192040 | A1 * | 10/2003 | Vaughan ......................... 717/173 |
| 2005/0198650 | A1 * | 9/2005 | Ford et al. ...................... 719/321 |
| 2006/0209328 | A1 * | 9/2006 | Anderson et al. ............. 358/1.13 |
| 2007/0229886 | A1 * | 10/2007 | Sakurai ......................... 358/1.15 |

FOREIGN PATENT DOCUMENTS

| JP | 2002149362 A | 11/2000 |
| JP | 2004054739 A | 2/2004 |

* cited by examiner

*Primary Examiner* — John Chavis
(74) *Attorney, Agent, or Firm* — Rossi, Kimms & McDowell LLP

(57) ABSTRACT

This invention relates to a device management apparatus. This device management apparatus is a device management apparatus which communicates with a client computer, includes an output management unit adapted to manage output information of a device for each user, an identification unit adapted to identify a user who is about to install a driver, a device extraction unit adapted to extract a device used by the user identified by the identification unit based on the output information, and a transmission unit adapted to transmit the driver of the device extracted by the device extraction unit to the client computer.

21 Claims, 17 Drawing Sheets

FIG. 11

INSTALL DRIVER

EXTRACTION CONDITION CATEGORY
- ☐ FREQUENTLY USED DEVICE
- ☐ RECENTLY USED DEVICE
- ☐ DEVICE WITH LARGE TOTAL OUTPUT AMOUNT
- ☐ RECENTLY USED DEVICE WITH LARGE TOTAL OUTPUT AMOUNT

EXTRACTION CONDITION
LAST USED DATE: [○] (MONTH) [×] (DAY) OR NEWER
AND
TOTAL OUTPUT AMOUNT: [△△] SHEETS OR MORE

[INSTALL NOW] [EXTRACT]

EXTRACTED DEVICE

| CHECK | LAST USED DATE | TOTAL OUTPUT AMOUNT |
|---|---|---|
| ☑ | ○ MONTH × DAY | ×× SHEETS |
| ☐ | ○ MONTH △ DAY | △△ SHEETS |
| ☑ | ☐ MONTH ☆ DAY | ○○ SHEETS |
| ☐ | ☐ MONTH ☆ DAY | ☐☐ SHEETS |

INSTALL DRIVERS OF CHECKED DEVICES   [EXECUTE] —1101

FIG. 12

INSTALL DRIVER

EXTRACTION CONDITION CATEGORY
- ☐ FREQUENTLY USED DEVICE
- ☐ RECENTLY USED DEVICE
- ▨ DEVICE WITH LARGE TOTAL OUTPUT AMOUNT
- ☐ RECENTLY USED DEVICE WITH LARGE TOTAL OUTPUT AMOUNT

EXTRACTION CONDITION

TOTAL OUTPUT AMOUNT
- ○ △△ SHEETS OR MORE
- ◉ TOP [3] DEVICES

[INSTALL NOW]  [EXTRACT]

EXTRACTED DEVICE

| CHECK | LAST USED DATE | TOTAL OUTPUT AMOUNT |
|---|---|---|
| ☑ | ○ MONTH × DAY | ×× SHEETS |
| ☐ | ○ MONTH △ DAY | △△ SHEETS |
| ☑ | ☐ MONTH ☆ DAY | ○○ SHEETS |
| | ☐ MONTH ☆ DAY | ☐☐ SHEETS |

INSTALL DRIVERS OF CHECKED DEVICES    [EXECUTE] — 1101

US 8,677,347 B2

DEVICE MANAGEMENT APPARATUS, CLIENT APPARATUS, AND DEVICE MANAGEMENT METHOD

CROSS-REFERENCE

This is a continuation of application Ser. No. 11/466,570 filed 23 Aug. 2006, the entire content of which is herein incorporated by reference.

BACKGROUND OF THE INVENTION

1. Field of the Invention

The present invention relates to a device management apparatus, client apparatus, and device management method for installing, for example, a device driver.

2. Description of the Related Art

In order to use computer peripheral devices in a newly purchased personal computer (PC) or in a PC whose operating system (OS) is re-installed, the user must install device drivers corresponding to such devices in the PC. A large number of devices exist on a large-scale network such as a corporate network or the like, but devices normally used by the user are only on some of them. For this reason, conventionally, when the user installs a device driver in the PC, he or she must find a target device from a large number of devices.

As one of several techniques that support installation of device drivers, a technique described in Japanese Patent Laid-Open No. 2004-054739 is known. With this technique, function-dependent frequencies of use are monitored in correspondence with respective functions of individual devices, and if a new function corresponding to each function is available, a driver is installed on the PC which requires that function.

Japanese Patent Laid-Open No. 2002-149362 describes a technique which calculates and displays a recommendation level as a selection criterion of a printer driver to be installed based on acquired print log information. With this technique, the user can easily select a printer which can be easily used and can install a corresponding driver in the computer. Japanese Patent Laid-Open No. 2002-149362 describes that the recommendation level is calculated by:

Recommendation level=$i$*(effective speed)+$k$/(average wait time)

(i and k: constants used to weight respective parameters)

The effective speed and average wait time can be expressed based on the acquired print log information (job information) by:

Effective speed=(number of output sheets per day)/ (effective running hours per day)

Average wait time=((effective running hours per day)/ $D$)*((effective running hours per day)/(number of jobs per day))

(D: printer running hours per day)

The User Selects a Printer to be Used with reference to a displayed printer list in descending order of recommendation level with numbers based on the recommendation levels, and a displayed user limitation presence/absence result, and installs a printer driver of the selected printer.

However, the technique described in the above reference merely presents devices frequently used by a plurality of users in place of a specific user. The conventional technique does not support the specific user to select a device he or she normally uses, and cannot reduce the load on each individual user upon installation of a device driver.

SUMMARY OF THE INVENTION

The present invention has been made in consideration of at least one of the prior arts, and has as one feature to provide a device management apparatus, client apparatus, and device management method, which support selection of a device to be used by the user from a large number of devices, and can reduce labor to install a device driver. Furthermore, the present invention has as another feature to provide a device management apparatus, client apparatus, and device management method, which can shorten the time required and improve productivity due to a reduction of the user's labor.

In order to achieve at least one feature described above, the present invention comprises the following arrangement. That is, there is provided a device management apparatus which communicates with a client computer, comprising: an output management unit adapted to manage output information of a device for each user; an identification unit adapted to identify a user who is about to install a driver; a device extraction unit adapted to extract a device used by the user identified by the identification unit based on the output information; and a transmission unit adapted to transmit the driver of the device extracted by the device extraction unit to the client computer.

Alternatively, there is provided a client apparatus connected to a device management server which manages output information of a device for each user, and extracts devices that match an input condition based on the output information, comprising:

a user interface unit adapted to input an extraction condition of devices;

an extracted device reception unit adapted to transmit the extraction condition input via the user interface unit to the device management server, and to receive device information extracted in response to the extraction condition;

a second user interface unit adapted to further select a device from devices associated with the device information received by the extracted device reception unit; and a transmission unit adapted to transmit the device information of the device selected via the second user interface unit to the device management server, wherein the device management server installs a driver in correspondence with the device associated with the device information transmitted by the transmission unit.

Alternatively, there is provided a device management system comprising:

a user interface unit adapted to input an extraction condition of devices;

an extraction unit adapted to extract devices according to the extraction condition input via the user interface unit; and an installation unit adapted to install device drivers for the devices extracted by the extraction unit.

According to the present invention, in a computer in which a new device driver must be installed, a driver of a device which was normally used by the user can be easily installed in a short period of time.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 shows a window display example when devices frequently used by the user are extracted with reference to the last use dates and the total numbers of printed sheets;

FIG. 12 shows a window display example when devices frequently used by the user are extracted with reference to the total numbers of printed sheets;

DESCRIPTION OF THE EMBODIMENTS

First Embodiment

Arrangement of Computer

Figure 1:
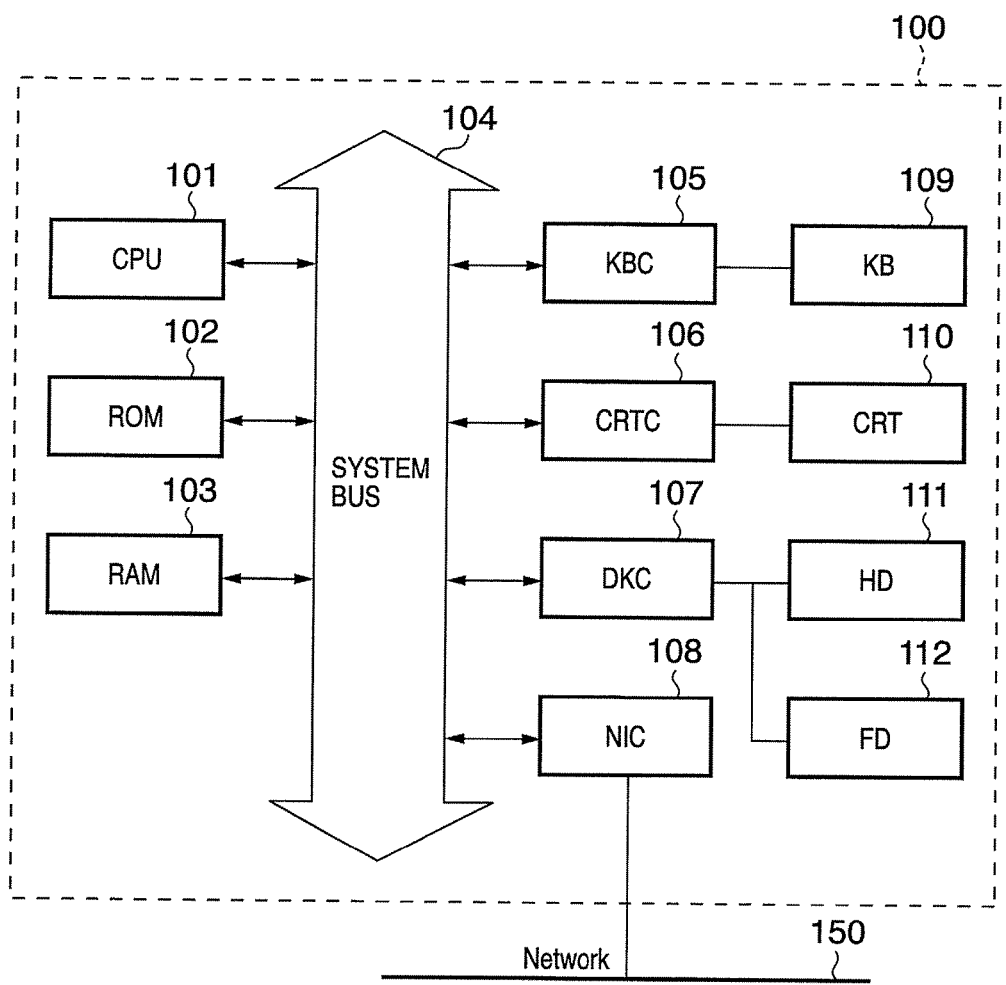
FIG. 1 is a block diagram showing the internal arrangement of a general personal computer.

A driver installation method according to this embodiment is implemented on a PC with the arrangement shown in FIG. 1. Referring to FIG. 1, a PC 100 is a computer on which applications run. The PC 100 comprises a CPU 101 which executes an operating system, device drivers, application programs, and the like. These programs are stored in a ROM 102 or a hard disk (HD) 111, or are supplied from a flexible disk (FD) 112. The CPU 101 systematically controls devices connected to a system bus 104. A RAM 103 serves as a main memory, work area, and the like of the CPU 101. A keyboard controller (KBC) 105 controls instruction inputs from a keyboard (KB) 109, a pointing device (not shown), and the like. A CPU controller (CRTC) 106 controls display on a CRT display (CRT) 110. A disk controller (DKC) 107 controls access to the hard disc (HD) 111 and flexible disk (FD) 112. These disk media store a boot program, operating system, edited files, user files, application programs, network control programs, and the like. A guidance program, output management program, device extraction program, driver installation program, and the like (to be described later) are also stored. A network interface card (NIC) 108 exchanges data in two ways with network devices and the like via a network 150. The network includes a LAN, the Internet, and the like. Note that an entity on hardware upon execution of processing is the CPU 101 unless otherwise specified, and the CPU 101 executes applicator programs installed in the hard disk (HD) 111. For the descriptive convenience, an expression having a program as an entity may often be adopted, but the execution entity is the CPU 101.

<Software Block Diagram in this Embodiment>

Figure 16:
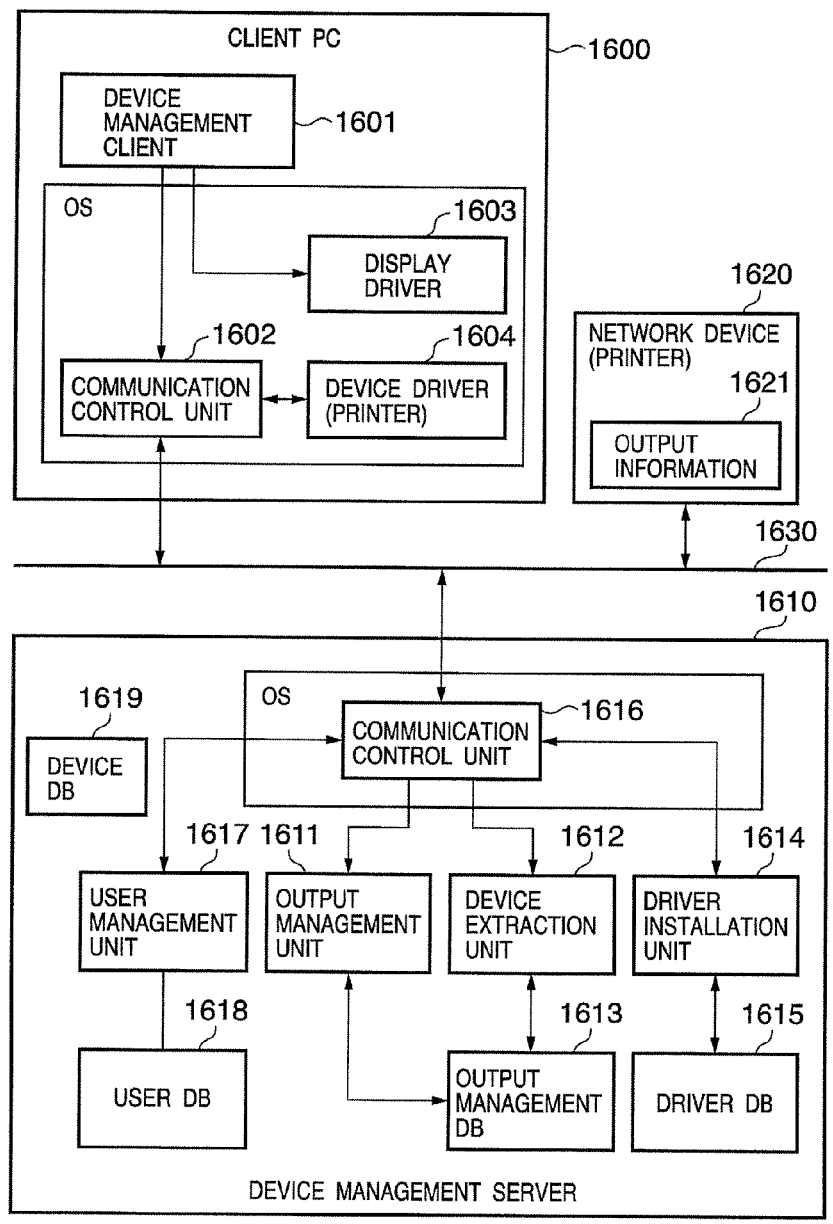
FIG. 16 is a block diagram showing software blocks of a server-client system according to the present invention.

FIG. 16 is a block diagram showing a device management server 1610 and client PC 1600 according to this embodiment. These computers comprise the arrangement shown in FIG. 1. Respective blocks in FIG. 16 are implemented by software or by collaboration of software and hardware. Of course, software is implemented when a program is executed by the CPU 101, and the program is stored in a medium such as the HD 111 or the like.

Referring to FIG. 16, the client PC 1600, the device management server 1610, and a network device 1620 are connected via a network 1630. The network device 1620 is a printer such as a single-function printer, multi-function printer (so-called multi-function peripheral device (MFP)), and the like. In the network device, an SNMP (Simple Network Management Protocol) agent and MIB (Management Information Base) are installed. An SNMP manager is installed in the device management server. Using the SNMP function, the device management server 1610 can acquire information indicating functions (capability) of the network device 1620.

The device 1620 saves output information 1621 for each user. The output information is included in print job data received from the client PC, and includes a user identifier (ID), output date and time (or may be an output date), and the number of sheets to be output (or the number of pages). The output information is saved for each job. The user identifier is the user ID of the user who has logged in when a device driver 1604 generated a print job. The output date and time is a date and time indicated by a real-time clock (not shown) when the device driver 1604 generated the print job. The number of sheets to be output is the number of sheets (or may be the number of pages) included in the print job generated by the device driver 1604. These pieces of output information are included in, e.g., a header of one print job, and are saved every time processing of each print job is complete. For example, when the aforementioned data structure is defined in the MIB, and each device saves output information in the MIB, the output information can be implemented. In this case, the output information is read out from the SNMP agent of the device by the SNMP manager of the device management server.

Figure 6:
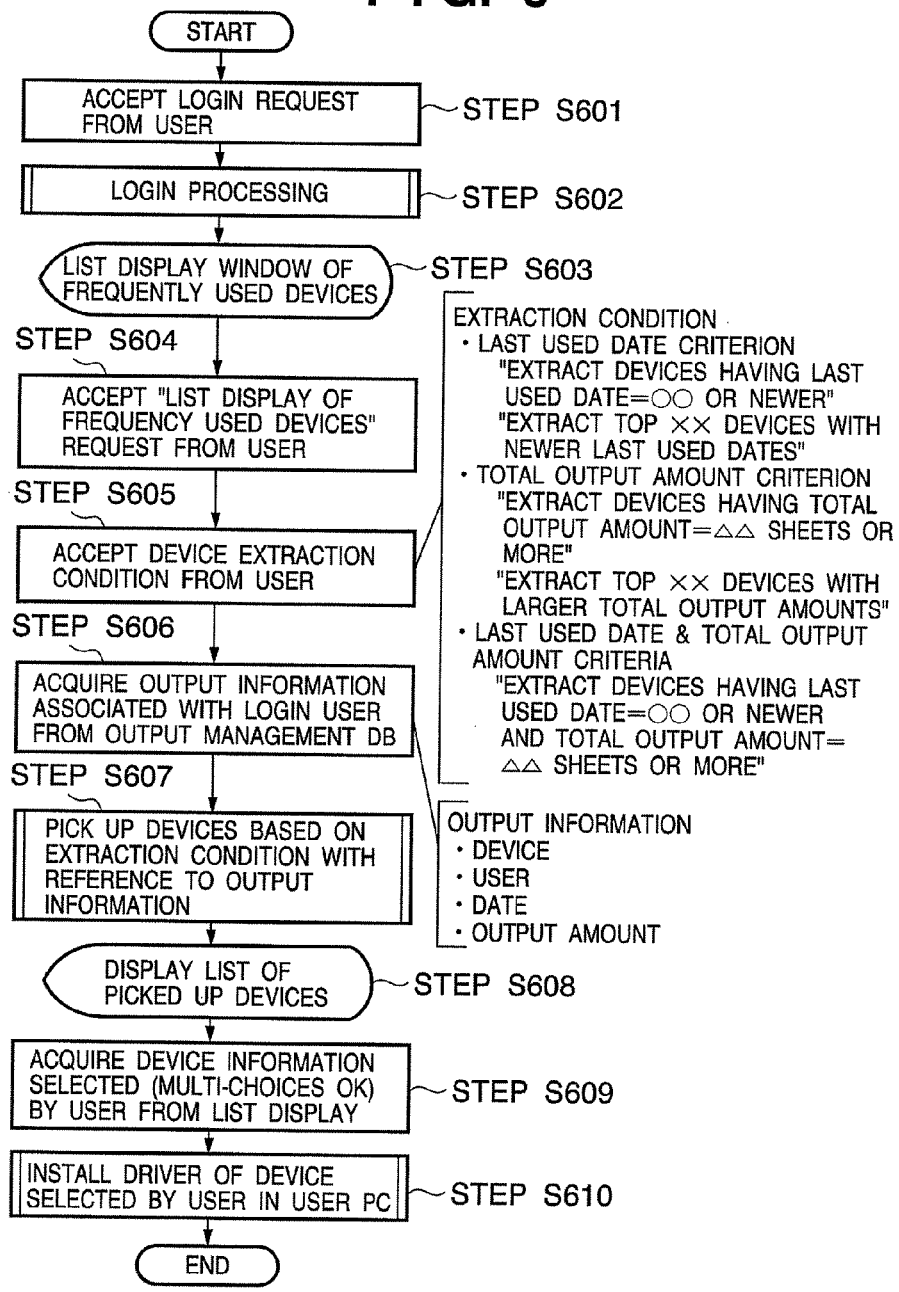
FIG. 6 is a flowchart showing processing for installing drivers of devices frequently used by the user by displaying drivers and prompting the user to select them.

In the client PC 1600, a device management client (program) 1601 which executes processing shown in FIG. 6 is installed to be executable. The device management client 1601 mainly performs user login processing and user interface display processing. The user interface allows the user to input conditions and the like required to select devices whose drivers are to be installed. The device management client 1601 transmits input information to the device management server 1610. The device management client 1601 receives information (to be referred to as device information hereinafter) indicating extracted devices from the device management server 1610, and presents the received information to the user. The device management client 1601 can be implemented as, e.g., an application program which can be explicitly launched by the user. The user launches this device management client 1601 upon installation of device drivers.

In the client PC 1600, an operating system and, as its components, a display driver 1603, a communication control unit (communication driver) 1602, and a device driver 1604 corresponding to the network device 1620, are also installed. Note that FIG. 16 illustrates only blocks according to the present invention. In response to a display request of the device management client 1601, the display driver 1603 displays a user interface window (to be described later), thus allowing user's inputs. Input information is transmitted to the device management server 1610 via the communication control unit (communication driver and NIC) 1602.

The device driver 1604 is a driver for providing print services in this embodiment. When the driver 1604 is called, it executes processing unique to the corresponding device. For example, since the driver 1604 is a printer driver, it converts input data into a PDL format that can be processed by the printer (network device) 1620, generates a print job, and transmits it to the printer 1620. In this case, a plurality of pieces of information such as items (user ID, date and time, and the number of sheets to be output) included in the output information and the like are written in a header and the like.

In the device management server 1610, an output management unit (output management program) 1611, a device extraction unit (device extraction program) 1612, and a driver installation unit (driver installation program) 1614 are installed. These units may often be called a device management unit together. The output management unit 1611 collects the output information 1621 of respective devices for all devices connected to the network 1630. The output management unit 1611 generates or updates an output management database (DB) 1613 based on the collected output information. Information required to identify a device to be managed, e.g., a device ID, address, or the like is registered in advance in the device management server. Using the SNMP function, the type of device on the network may be dynamically acquired, and an object to be managed can be identified as, e.g., a printer device or the like.

One record of the output management database 1613 includes a device identifier in addition to the contents of the output information. The device extraction unit 1612 retrieves (extracts) devices which meet conditions received from the client PC 1600 with reference to the output management database 1613. The device extraction unit 1612 transmits the extracted device information to the client PC 1600. The driver installation unit 1614 retrieves a device driver corresponding to the designated device identifier from a driver database 1615, and push-installs the retrieved driver in the designated client PC. Push installation of a device driver is an already implemented function, and a detailed description thereof will be omitted. Of course, a communication with the client PC is made via the operating system and the communication control unit 1616.

Figure 5A:
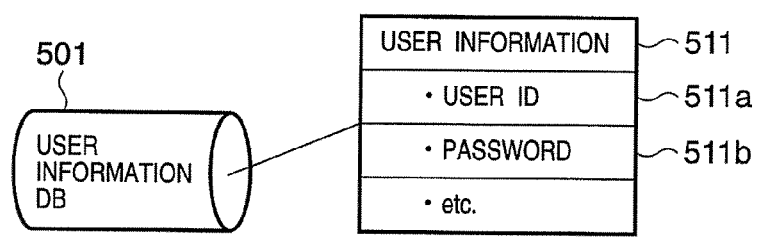
FIG. 5A shows user information to be managed by the device management tool.

The device management server 1610 comprises a user management unit 1617 and a user DB 1618 which are used to manage users. One record in the user DB 1618 is as shown in user information 511 in FIG. 5A. The user management unit 1617 authenticates the user who is about to log in. A device database 1619 is registered with device IDs and addresses (IP addresses or the like) of network devices to be managed.

The guidance program and device management server according to the present invention are configured, as described above.

<Login Processing>

Figure 2:
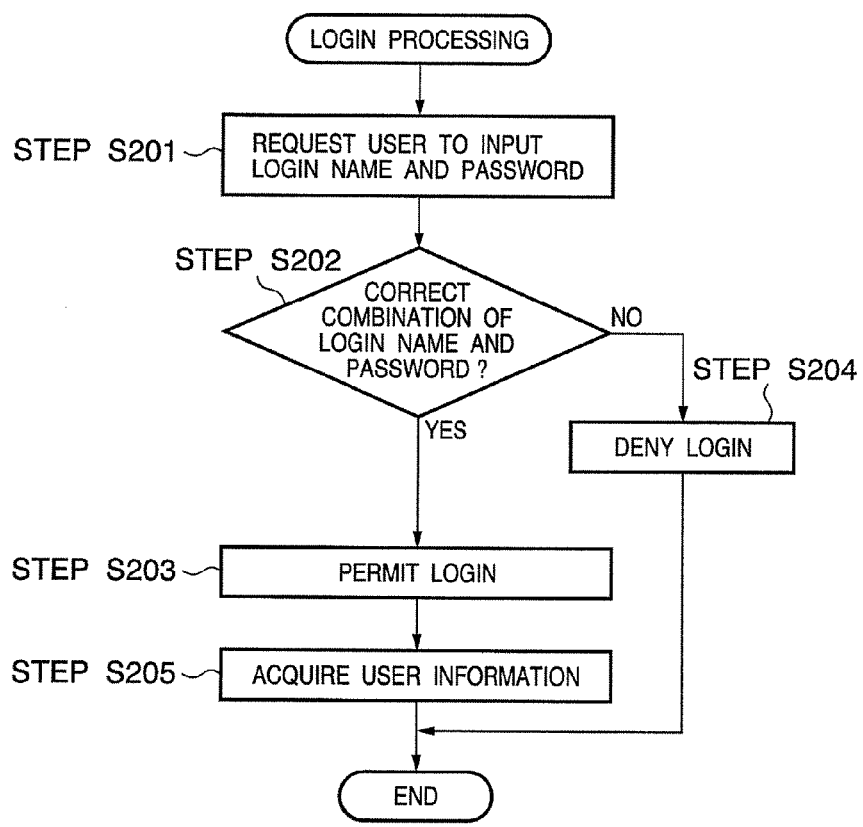
FIG. 2 is a flowchart of login processing to a device management tool.

FIG. 2 shows the login flow of a general application. This processing is executed by, e.g., the operating system or the like at the beginning of use of the computer. This sequence is not unique to the present invention but is the one which is executed generally. Upon reception of a login request from the user, step S201 is started. In step S201, a system (a computer system including the operating system and applications will be shortened into "system" hereinafter) requests the user to input a login name (user ID) and password, and accepts these inputs. The system checks in step S202 if a combination of the login name and password input by the user in step S201 is correct. If the combination is correct, the flow advances to step S203. In step S203, the system permits the user to log in. In step S205, the system acquires user information (user ID and password) of the login user, which is saved in the user information DB 501 shown in FIG. 5A. The acquired user information is saved in a memory, hard disk, or the like as login user information indicating the current login user. When the user logs out, the login user information is erased.

If the system determines in step S202 that the combination of the login name (user name) and password is incorrect, the flow advances to step S204. In step S204, the system does not permit the user to log in.

In step S202, a user ID 511*a* and password 511*b* are read with reference to the user information DB 501, and are compared with the input user ID and password. If they match, the system determines an authentic user.

<Output Information Collection Processing>

Figure 3:
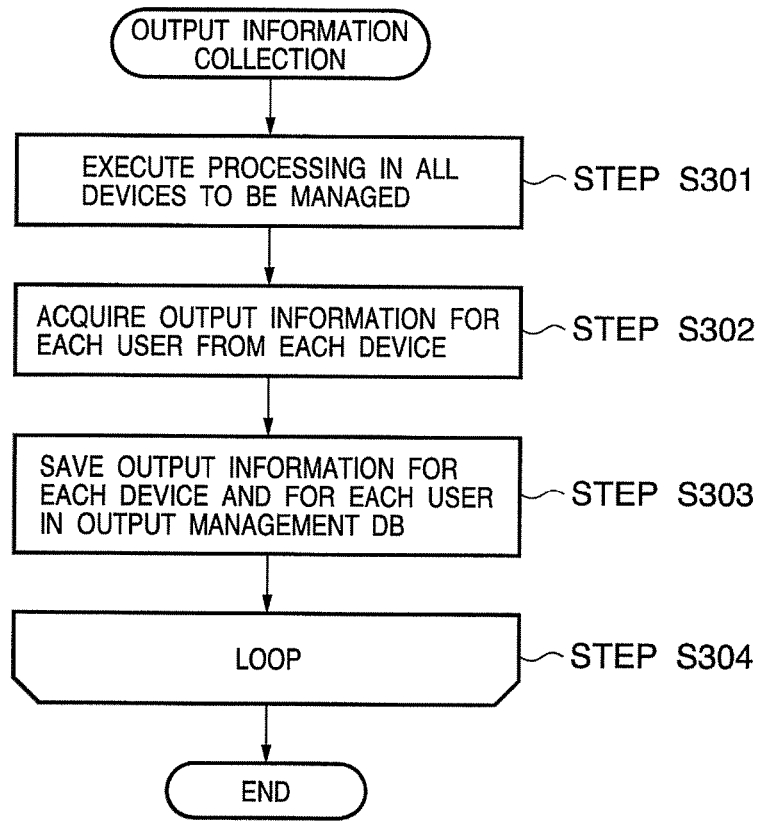
FIG. 3 is a flowchart of output information collection processing of the device management tool.

FIG. 3 shows the flow of output information collection processing for collecting output information to be used in the present invention. This sequence is executed by the output management unit 1611 shown in FIG. 16. When the system starts the output information collection processing, step S301 is started. In step S301, the system enters a loop of collecting output information in all devices to be managed. The end of the loop is step S304, and steps S301 to S303 are repeated.

Figure 5B:
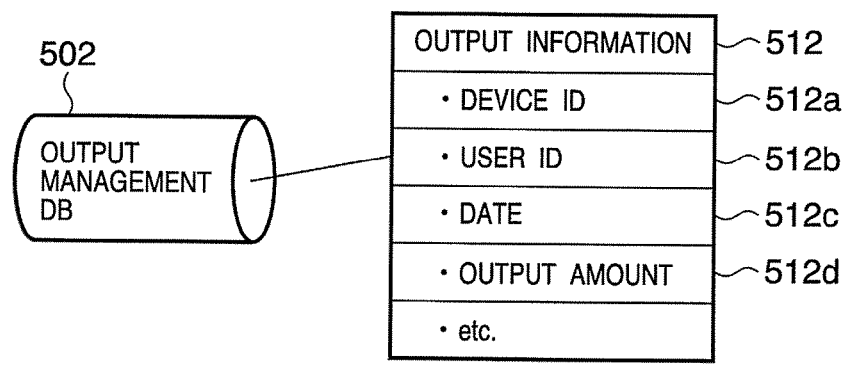
FIG. 5B shows output information to be managed by the device management tool.

In step S302, the system acquires output information for each device and for each user from each client. The output information to be acquired includes a user ID, date (date and time), and output amount (the number of sheets to be output). In step S303, the system saves the output information acquired in step S302 in an output management DB 502 in FIG. 5B. FIG. 5B shows the configuration of one record of that DB. One record includes a device ID 512*a* in addition to a user ID 512*b*, date (date and time) 512*c*, and output amount (the number of sheets to be output) obtained from the output information. The device ID is an identifier unique to a device from which output information is to be read out.

If devices from which output information is to be collected of the devices to be managed still remain in output information step S304, the flow returns to step S301. If output information collection is complete in all the devices to be managed, this flow ends. In this manner, output information is acquired from each of all the devices to be managed on the network, thus configuring the output database. Note that the storage capacity of each device has a limitation. Once the output management database is configured, output information stored in each device may be cleared immediately after the end of the loop in step S304. In this case, the output management database may be re-configured, but the output information acquired from each device may be added to the output management database.

<Device Driver Installation Processing>

FIG. 6 shows the flow that provides a function of allowing the user to easily select and install drivers of devices normally used by the user without selecting from a large number of devices in the device extraction processing according to the first embodiment. This processing is executed by the device management server 1610. In the user interface display and input steps, the display of and input to the user interface are implemented by the device management client. In practice, a communication is made between the client and server, and a description thereof will be omitted in some cases. In the arrangement shown in FIG. 16, the driver of the device 1620 has already been installed in the client PC 1600. However, the installation processing to be described below is executed in a state wherein a device driver of the network device is not installed at all in the client PC 1600.

When the user launches the device management client 1601, the device management server is notified of that fact. The device management server 1610 transmits a message that requests the user to log in to the device management client 1601. The login request is made via a user interface provided by the device management client 1601. Then, step S601 is started.

In step S601, the device management server 1610 receives the login request from the user via the device management client 1601. In step S602, the user management unit 1617 of the device management server 1610 executes user login processing according to the flow shown in FIG. 2. If the login of the user is permitted in step S602, the flow advances to step S603.

Figure 15:
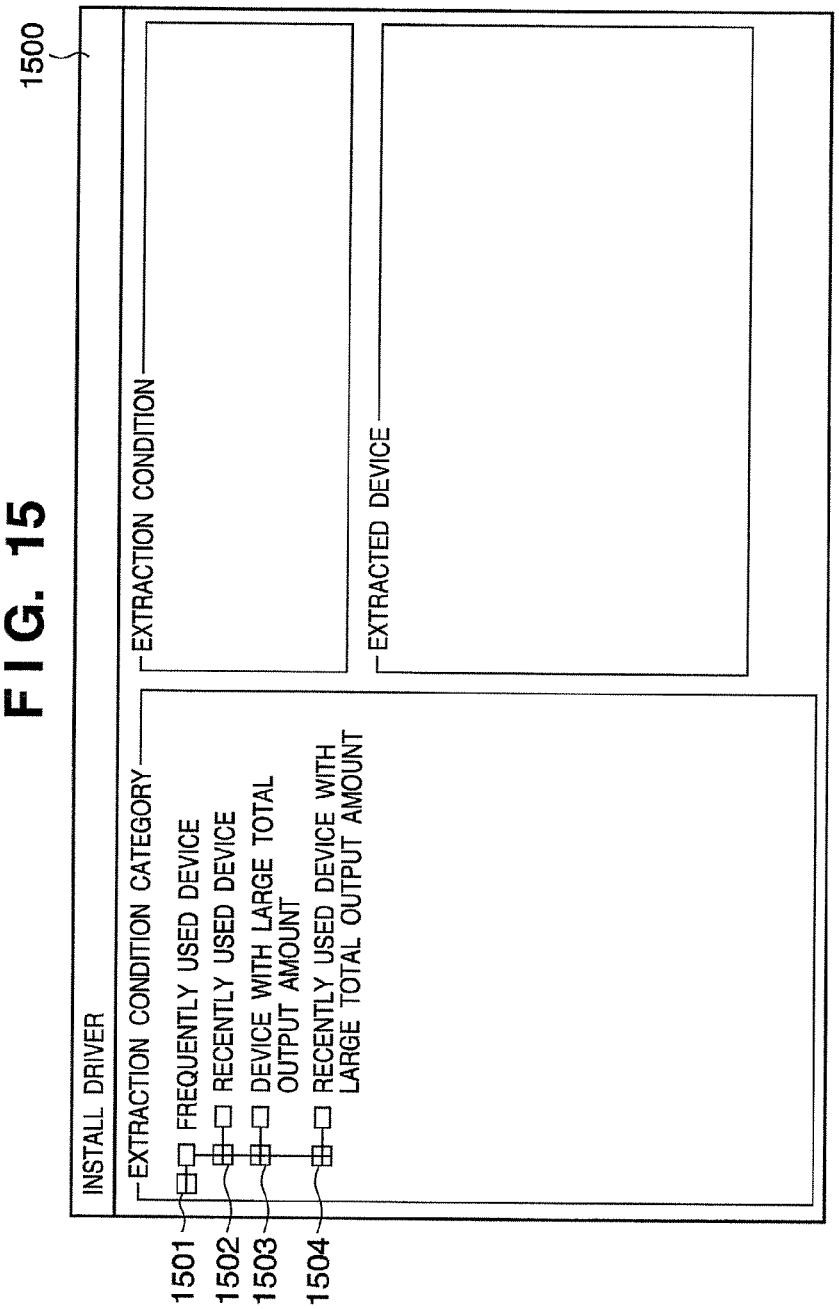
FIG. 15 shows a window display example used to input extraction conditions of devices frequently used by the user.

In step S603, the device extraction unit 1612 displays a list display window of devices which are frequently used by the user on the client PC via the device management client 1601. In this case, for example, a window shown in FIG. 15 is displayed. A window 1500 is divided into an extraction condition category area, extraction condition area, and extracted device area. The extraction condition categories indicate categories of conditions used as device extraction criteria. The extraction condition category area displays a "frequently used device" field 1501. FIG. 15 includes options of device extraction criteria such as "recently frequently used device" 1502, "device with large total output amount" 1503, and "recently frequently used device with large total output amount" 1504. In step S603, such options are not displayed.

In step S604, the device extraction unit 1612 accepts a list display request of frequently used devices from the user via the device management client 1601. This request is accepted when the user selects the "frequently used device" field 1501 by clicking. With this selection, the options of the device extraction criteria including "recently frequently used device" 1502, "device with large total output amount" 1503, and "recently frequently used device with large total output amount" 1504 in FIG. 15 are displayed. This change in display may be made by either the device management client 1601 or the device management server 1610.

In step S605, the device extraction unit 1612 receives extraction conditions of frequently used devices from the user via the device management client 1601. Note that the extraction conditions include that having the last use dates of devices as a criterion, that having the total numbers of printed sheets output to devices as a criterion, and that having both the last use dates and the total numbers of printed sheets output to devices as criteria. The user can select one of these conditions from the aforementioned options 1502 to 1504. Selection is attained by, e.g., clicking.

Furthermore, the user can designate detailed extraction conditions in the designated extraction criterion. When "recently frequently used device" 1502 is designated as the extraction criterion, a threshold can be designated. As the threshold, for example, one of the last use date (reference date) and the number of days tracking back from the current date can be designated. When the reference date is designated, a rank can be designated to limit the number of devices. The designated threshold can be identified based on check boxes used to designate these thresholds or different numerical value formats. When "device with large total output amount" 1503 is selected as the extraction criterion, the total number of sheets to be output (the reference number of sheets) or rank (reference rank) can be designated as an extraction condition.

When "recently frequently used device with large total output amount" 1504 is selected as the extraction criterion, the last use date and the total number of sheets to be output can be designated as extraction conditions. The last use date can be designated by the number of days tracking back from the current date. Information indicating the selected extraction criteria and information indicating the input extraction conditions are transmitted to the device management server 1610. Also, the current login user information is transmitted to the device management server 1610.

Figure 8:
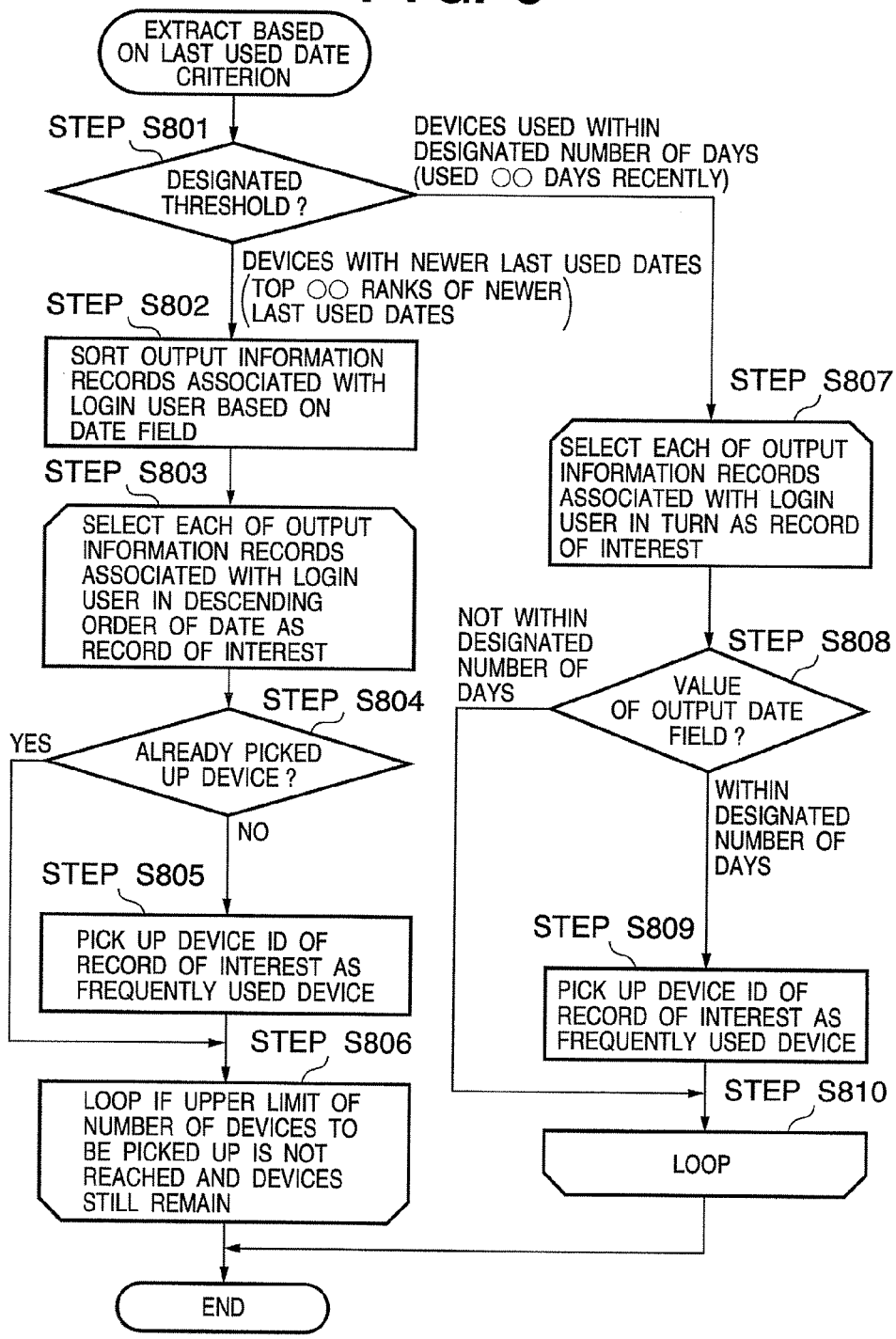
FIG. 8 is a flowchart showing processing for extracting devices frequently used by the user with reference to the last use dates.
Figure 9:
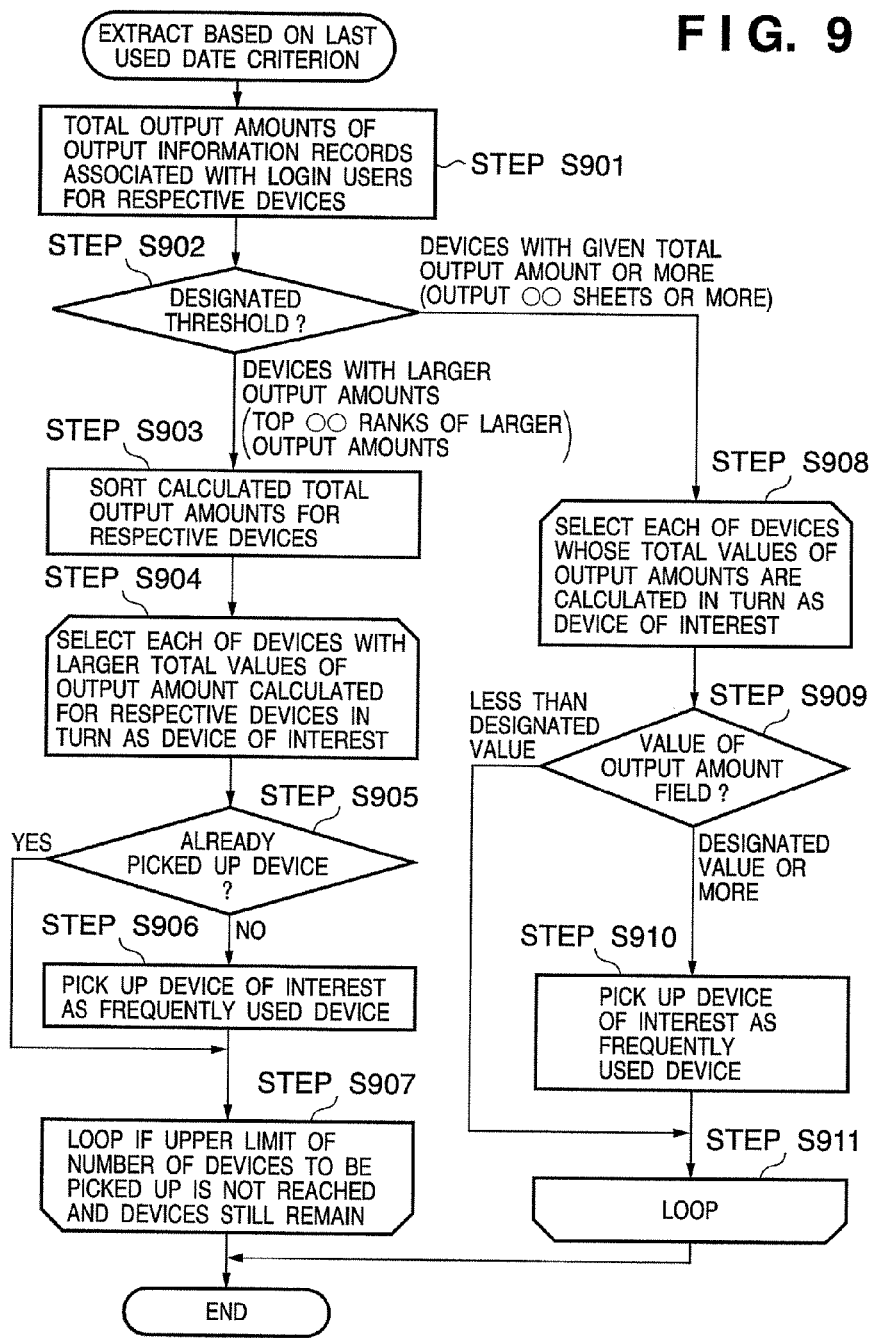
FIG. 9 is a flowchart showing processing for extracting devices frequently used by the user with reference to the total numbers of printed sheets.
Figure 10:
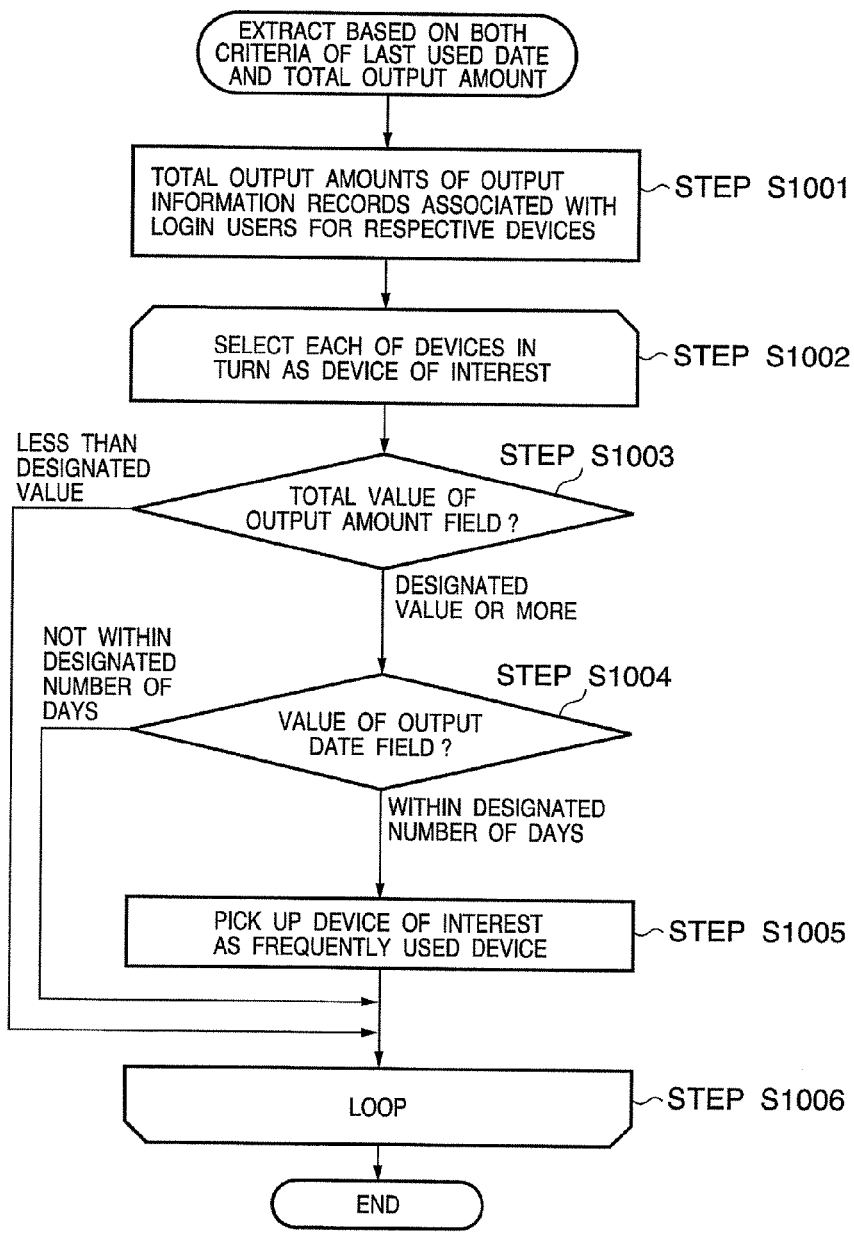
FIG. 10 is a flowchart showing processing for extracting devices frequently used by the user with reference to the last use dates and the total numbers of printed sheets.

In step S606, the device extraction unit 1612 acquires the output information about the login user from the output management DB 502. In step S607, the device extraction unit 1612 extracts devices frequently used by the user based on the device extraction conditions accepted from the user in step S605 and the output information about the login user acquired from the output management DB in step S606. The processing in step S607 will be described in detail later with reference to FIGS. 8, 9, and 10. The processing contents in step S607 are different depending on the device extraction criteria (categories) selected by the user in step S605. If the extraction criterion is "recently frequently used device" 1502, processing in FIG. 8 is executed; if it is "device with large total output amount" 1503, processing in FIG. 9 is executed; and if it is "recently frequently used device with large total output amount" 1504, processing in FIG. 10 is executed.

In step S608, a list of extracted devices is displayed based on the device information extracted in step S607. If the selected extraction condition is "recently frequently used device with large total output amount", a window shown in, e.g., FIG. 11 is displayed. If the selected extraction condition is "device with large total output amount", a window shown in, e.g., FIG. 12 is displayed. In this case, each extracted device information is transmitted from the device extraction unit 1612 to the device management client 1601, which displays a list of devices and the like based on the received information. The user can select a desired one of listed devices on this user interface window. FIGS. 11 and 12 show examples of the user interface. FIG. 11 shows a display example when "recently frequently used device with large total output amount" is selected. In the extraction condition area, the last use date and output amount are designated. On the extracted device area (lower right area in FIG. 11), a list of devices which match the designated conditions is displayed. In FIG. 11, the user selects a desired device by checking a check box corresponding to that device. FIG. 12 shows substantially the same window as that in FIG. 11, except that the selected category and extraction conditions are different from FIG. 11. The selection result (for example, the device ID of the selected device) is transmitted from the device management client 1601 to the device management sever 1610.

In step S609, the device management server 1610 acquires the device information (e.g., device ID) selected by the user from the device management client 1601. In step S610, the driver installation unit 1614 installs a driver of the device selected by the user in step S609 in the client PC of the login user according to the driver installation flow shown in FIG. 4.

<Device Extraction Processing 1>

FIG. 8 shows processing executed when "recently frequently used device" is selected in step S607 as the extraction criterion used to extract devices frequently used by the user. In this processing, devices are extracted with reference to the last use dates of devices. In the extraction flow of devices frequently used by the user, when the user designates the last use date of the user for each device as the device extraction condition, step S801 is started.

The device extraction unit 1612 checks in step S801 if the threshold input as the device extraction condition is the last use date (reference date) or the number of days (the reference number of days). If the reference date is input, the flow advances to step S802; otherwise, the flow advances to step S807.

If the last use date is designated, devices with newer last use dates by the login user are extracted up to the designated rank (the rank designated by the user). For this purpose, in step S802 records (which will be referred to as records associated with the login user) of output information with the user ID which matches that of the login user are extracted from the output information DB 502. The extracted records are sorted in descending order of used date 512c. In step S803, the device extraction unit 1612 selects output information associated with the login user sorted in descending order of used date in step S802 in turn from a record with the latest used date as a record of interest. The device extraction unit 1612 checks in step S804 if the device ID included in the current record of interest has already been extracted. This checking step is implemented by referring to device information that saves the extracted device IDs and the like. The device information is saved in, e.g., a hard disk or the like of the device management server. The device ID that has already been included in the device information is determined as that of an already extracted device. If the device of the record of interest is a non-extracted device, the flow advances to step S805; otherwise, the flow jumps to step S806.

In step S805, the device ID included in the record of interest is extracted as a frequently used device, and is additionally registered in the device information. If it is determined in step S806 that the rank of the already extracted device (i.e., the number of already extracted devices) does not reach that designated by the user, and records to be inspected still remain, the flow returns to step S802.

On the other hand, if it is determined in step S801 that the threshold designated by the user is the reference number of days, the flow advances to step S807. In step S807, the device extraction unit 1612 extracts a record including the user ID of the login user from output information of the output information DB 502 and selects it as a record of interest. The device extraction unit 1612 checks in step S808 if the date (used date) 512c of the extracted record falls within the number of days designated by the user from the current date. If the used date falls within the designated number of days, the flow advances to step S809; otherwise, the flow jumps to step S810.

In step S809, the device ID included in the record of interest as that of a frequently used device. The extracted device ID is additionally registered in the device information. If it is determined in step S810 that records to be inspected about the login user still remain, the flow returns to step S807. With the aforementioned processing, devices frequently used by the user are extracted.

<Device Extraction Processing 2>

FIG. 9 shows the flow executed when devices are extracted with reference to the total output amounts of devices upon extracting devices frequently used by the user. In the extraction flow of devices frequently used by the user, when the user designates the total number of sheets to be output of the user for each device as the device extraction condition, step S901 is started.

In step S901, the values of the output amounts 512d in records associated with the login user in the output information DB 502 are extracted, and are totaled for respective device IDs. In this way, the total output amounts of the user for respective devices are calculated. Furthermore, records each including the calculated total output amount and device ID are formed for respective devices, and are saved in the form of, e.g., a table or the like in a memory or the like. The device extraction unit 1612 checks in step S902 if the value designated by the user as a threshold used to extract devices is the reference number of sheets or reference rank. This checking step can be implemented based on, e.g., a flag corresponding to a check box input to designate by the user or the format of data.

If the reference rank is designated, i.e., if a designated number of devices with large total output amounts are to be extracted, the flow advances to step S903. On the other hand, if the reference number of sheets (i.e., the reference amount) is designated, i.e., if devices which have the total number of sheets to be output equal to or larger than the designated number of sheets are to be extracted, the flow advances to step S908.

In step S903, the device extraction unit 1612 sorts the contents of the table of total output amounts of the user for respective devices calculated in step S901 using the output amounts. In step S904, the result sorted in step S903 is selected in turn from records (i.e., devices) with the larger output amounts in turn as a record of interest. It is checked in step S905 if the device ID included in the record of interest has already been extracted. In this case, it is determined with reference to the device information which is being created that the device ID included in that record has already been extracted. If the device ID has not been extracted, the flow advances to step S906; otherwise, the flow jumps to step S907.

In step S906, the device ID included in the record of interest is extracted as that of a frequently used device. The extracted device ID is additionally registered in the device information. If it is determined in step S907 that the number of already extracted devices does not reach the value designated by the user, and devices to be inspected still remain, the flow returns to step S904.

If it is determined in step S902 that the threshold designated by the user is the value of the total number of sheets to be output, i.e., devices which have the total number of sheets to be output equal to or larger than the designated number of sheets are to be extracted, the flow advances to step S908. In step S908, a record (i.e., a device) of the table of the total output amounts of the user for respective devices calculated in step S901 is selected in turn as a record of interest. In step S909, the system compares the total output amount of the record of interest with the threshold designated by the user. If the total output amount is equal to or larger than the threshold, the flow advances to step S910. If the total output amount is smaller than the designated threshold, the flow jumps to step S911. In step S911, the device ID included in the record of interest is extracted as that of a frequently used device. The extracted device ID is additionally registered in the device information. If it is determined in step S911 that records to be inspected still remain, the flow returns to step S908. With the above-mentioned processing, devices frequently used by the user are extracted.

<Device Extraction Processing 3>

FIG. 10 shows the flow executed when devices are extracted with reference to both the last use dates and total output amounts of devices upon extracting devices frequently used by the user. In the extraction flow of devices frequently used by the user, when the user designates the last use date and total output amount of the user for each device as the device extraction conditions, step S1001 is started.

In step S1001, the device extraction unit 1612 extracts values of the output amounts 512d of records associated with the login user in the output information DB 502, and totals them for respective device IDs. In this way, the total output amounts of the user for respective devices are calculated. The last use dates for respective devices are obtained by comparing the dates of records with common device IDs. Records are formed for respective devices by associating the calculated total output amounts and last use dates with the device IDs, and are saved in the form of, e.g., a table or the like in a memory or the like.

In step S1002, each of records (i.e., devices) in the table calculated in step S1001 is selected in turn as a record of interest. In step S1003, the total output amount of the record of interest is compared with the threshold designated by the user. If the total output amount is equal to or larger than the designated threshold, the flow advances to step S1004; otherwise, the flow jumps to step S1006. In step S1004, the last use date of the record of interest is compared with the value (number of days) designated by the user. If the last use date falls within the designated period, i.e., it is newer than a date tracking back from the current date by the designated number of days, the flow advances to step S1005. If the last use date falls outside the designated period, the flow jumps to step S1006. In step S1005, the device ID of the record of interest is extracted as that of a frequently used device. The extracted device ID is additionally registered in the device information. If it is determined in step S1006 that devices to be inspected still remain, the flow returns to step S1002. With the above-mentioned processing, devices frequently used by the user are extracted.

<Installation Processing>

Figure 4:
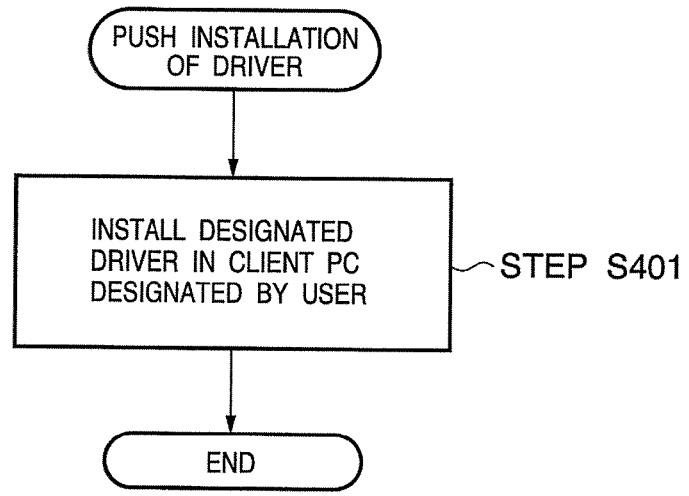
FIG. 4 is a flowchart of driver push install processing of the device management tool.

FIG. 4 shows the flow executed when a driver is installed in the client PC. This processing is executed by the driver installation unit 1614 in FIG. 16 in step S610 in FIG. 6. When the device management server 1610 receives a message of an installation request (e.g., pressing of an execution button 1101 in FIG. 11 or 12) together with designation of the device ID of an installation target from the user, step S410 is started. In step S401, the device installation unit 1614 reads a driver file corresponding to the designated device ID from the driver database 1615 and transmits it to the client PC. The client PC may be designated by the user or a client used by the user who selected the device may be selected as a target. The client as the transmission destination installs the transmitted driver file. That is, the designated driver is installed.

With the above arrangement and processing, the device management system of this embodiment extracts devices with newer used dates or those used at higher frequencies of use based on the use logs of devices by the user who is about to install a driver. Then, the driver can be installed to have the extracted devices as candidates. For this reason, the user can quickly and easily select a device, the driver of which is to be installed.

Modification of First Embodiment

In this embodiment, the last use dates and the total numbers of printed sheets of devices for each user are used as the extraction conditions. Of course, the present invention is not limited to such specific conditions. For example, devices with larger numbers of records can be extracted to have the number of jobs (i.e., the number of records for each use and for each device in the output management DB) as a condition. On the other hand, when the device management server saves the physical locations of the devices and client PCs, closest devices can be extracted to have distances to the client PC used by the user as a condition. Furthermore, when the device management server saves information associated with devices which are permitted to be used for each user, device IDs which are inhibited from being used by the user of interest can be deleted from the extracted device information. In this way, devices can be extracted under various extraction conditions.

Second Embodiment

Figure 7:
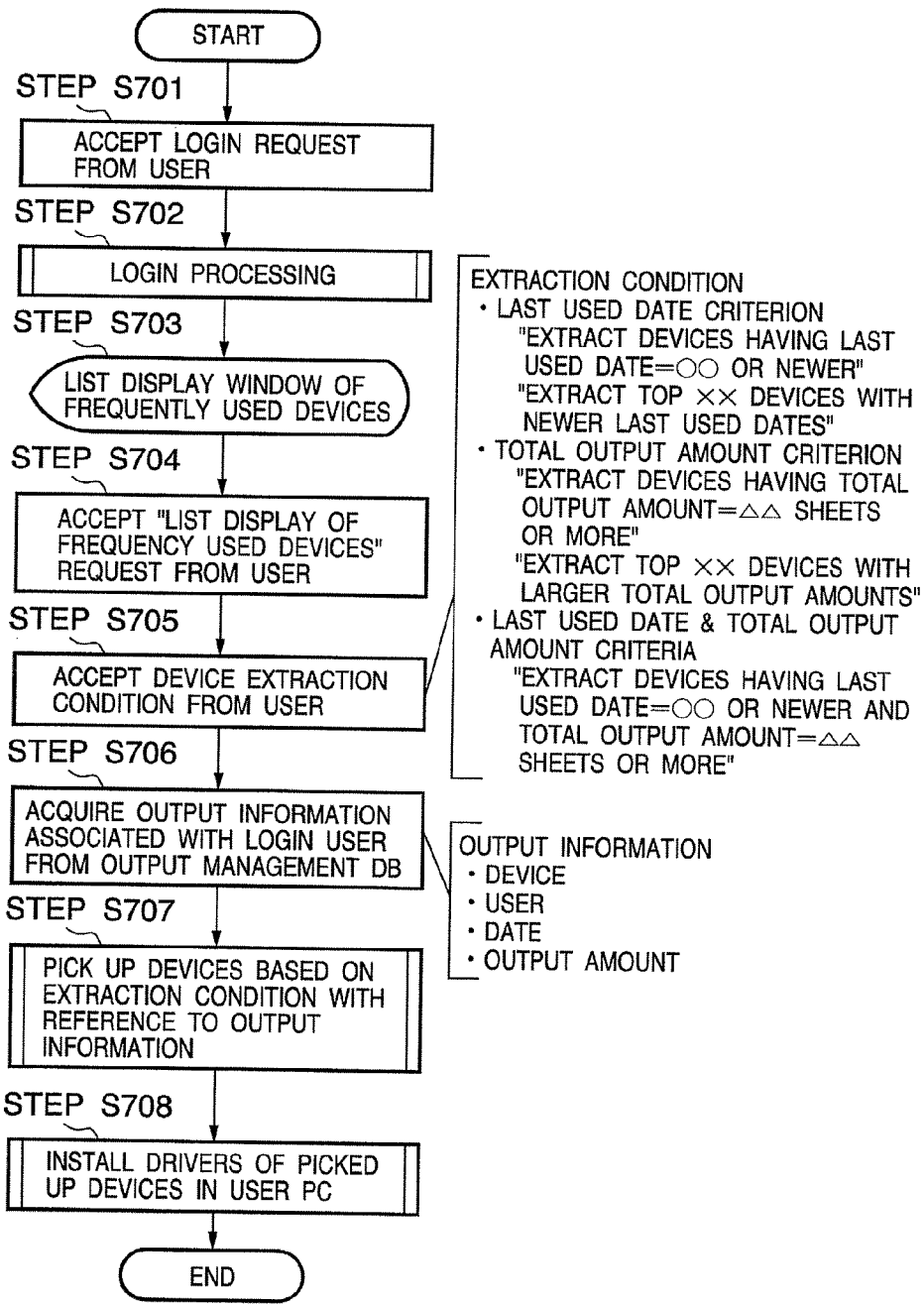
FIG. 7 is a flowchart showing processing for installing drivers of devices frequently used by the user without any user's choice.

FIG. 7 shows the flow that provides a function of allowing the user to easily select and install drivers of devices normally used by the user without selecting from a large number of devices in the device extraction processing according to the second embodiment of the present invention. In this embodiment, drivers are installed for all devices extracted according to the extraction conditions. In the following description, "system" indicates the device management server 1610. Upon making inputs and outputs with the user, they are made via the user interface provided by the device management client 1601, as has been described in the first embodiment.

When the user makes a login request to the system, step S701 is started. In step S701, the system accepts the login request from the user. In step S702, the system executes user login processing according to the flow shown in FIG. 2. If the login of the user is permitted in step S702, the flow advances to step S703. In step S703, the system displays a list display window of devices which are frequently used by the user. In this case, for example, the window shown in FIG. 15 is displayed. In step S704, the system accepts a list display request of frequently used devices from the user. In step S705, the system accepts extraction conditions of frequently used devices from the user. Note that the extraction conditions includes a condition having the last use date of a device as a criterion, that having the total number of sheets output to a device as a criterion, and that having both the last use date and the total number of sheets to be output as criteria. Depending on the device extraction criteria selected by the user in step S705, the contents of device pickup processing in step S707 change. In step S706, the system acquires the output information about the login user from the output management DB 502 in FIG. 5B. In step S707, the system picks up devices frequently used by the user based on the device extraction conditions accepted from the user in step S705 and the output information about the login user acquired from the output management DB 502 in step S706. The processing in step S707 has been described with reference to FIGS. 8, 9, and 10 above. In step S708, drivers of the devices extracted in step S707 are installed in the user PC according to the driver installation flow shown in FIG. 4.

Although a simplified explanation is given in the above description, the sequence in FIG. 7 is obtained by omitting steps S608 and S609 from the processing in FIG. 6. The windows in FIGS. 11 and 12 are omitted from the user interface accordingly, and these windows are not displayed.

With this configuration, according to this embodiment, device selection can be further simplified and speeded up. In addition, drivers are installed for all devices which have use records and meet given conditions as targets. For this reason, devices as installation targets can be prevented from being not selected.

Third Embodiment

Figure 13:
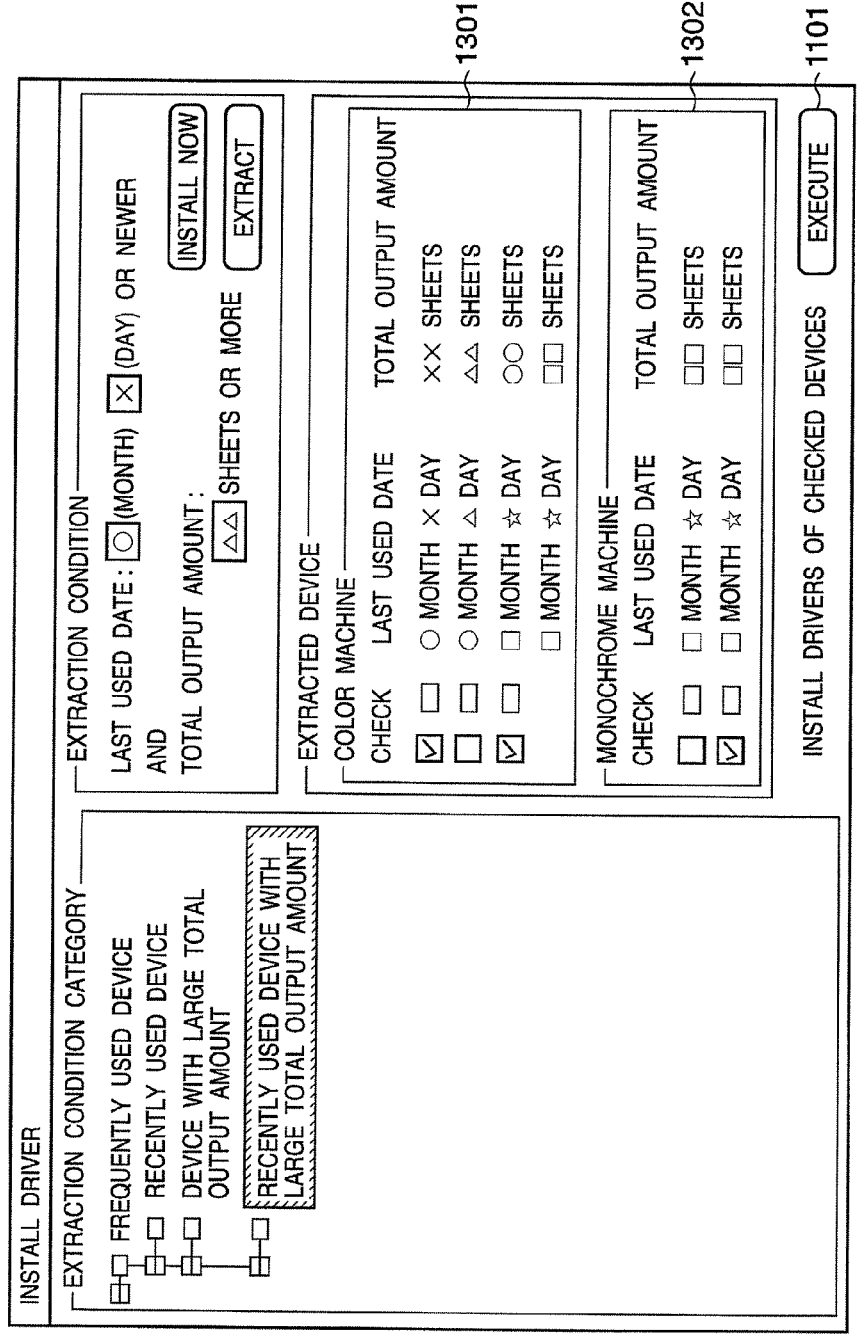
FIG. 13 shows a window display example when devices frequently used by the user are extracted with reference to the last use dates and the total numbers of printed sheets, and are displayed in correspondence with capabilities of the devices.

FIG. 13 shows a window display example when extracted devices are displayed to be classified into color machines and monochrome machines in the device extraction processing according to the third embodiment of the present invention. In the example of FIG. 13, extracted devices are displayed for color and monochrome machines, respectively.

The arrangement and processing sequence of the apparatus in this embodiment is basically the same as those of the first embodiment, except for the following points.

The device extraction unit 1612 further modifies the device information extracted in step S607 in FIG. 6 before transmission to the client. Initially, the device extraction unit 1612 requests and acquires function information indicating functions to an address corresponding to each device ID included in the device information. This address is, for example, an IP address, and the IDs and addresses of devices to be managed are registered in advance in the device management server 1610. The function information is registered in an MIB managed by the device, e.g., a printer MIB. For this purpose, the device management server 1610 issues "GetRequest" by designating the address of that device and an object identifier corresponding to the function information. When the function information is acquired in this way, information indicating whether or not color printing is supported is referred to. Then, a color flag indicating whether or not color printing is supported is added in correspondence with each device ID in the device information. This device information is transmitted to the device management client 1601 in step S608. The device management client 1601 displays color devices in a color machine list 1301 and monochrome devices in a monochrome machine list 1302 with reference to the color flags.

Except for the above differences, the processing of this embodiment is the same as that in the first embodiment. With the above configuration and processing, the device management system of this embodiment can present the functions of devices (color or monochrome in the above example) to the user. For this reason, the user can select a device for each function. Therefore, the functions are not limited to color and monochrome. For example, various functions such as an upper limit paper size, the presence/absence of a finisher, the presence/absence of a booklet function, and the like can be presented to the user. Functions which are not managed on the standard basis by the MIB can be managed by defining object identifiers for respective vendors. Also, functions of respective devices may be registered in advance in the device management server.

Modification of Third Embodiment

Figure 14:
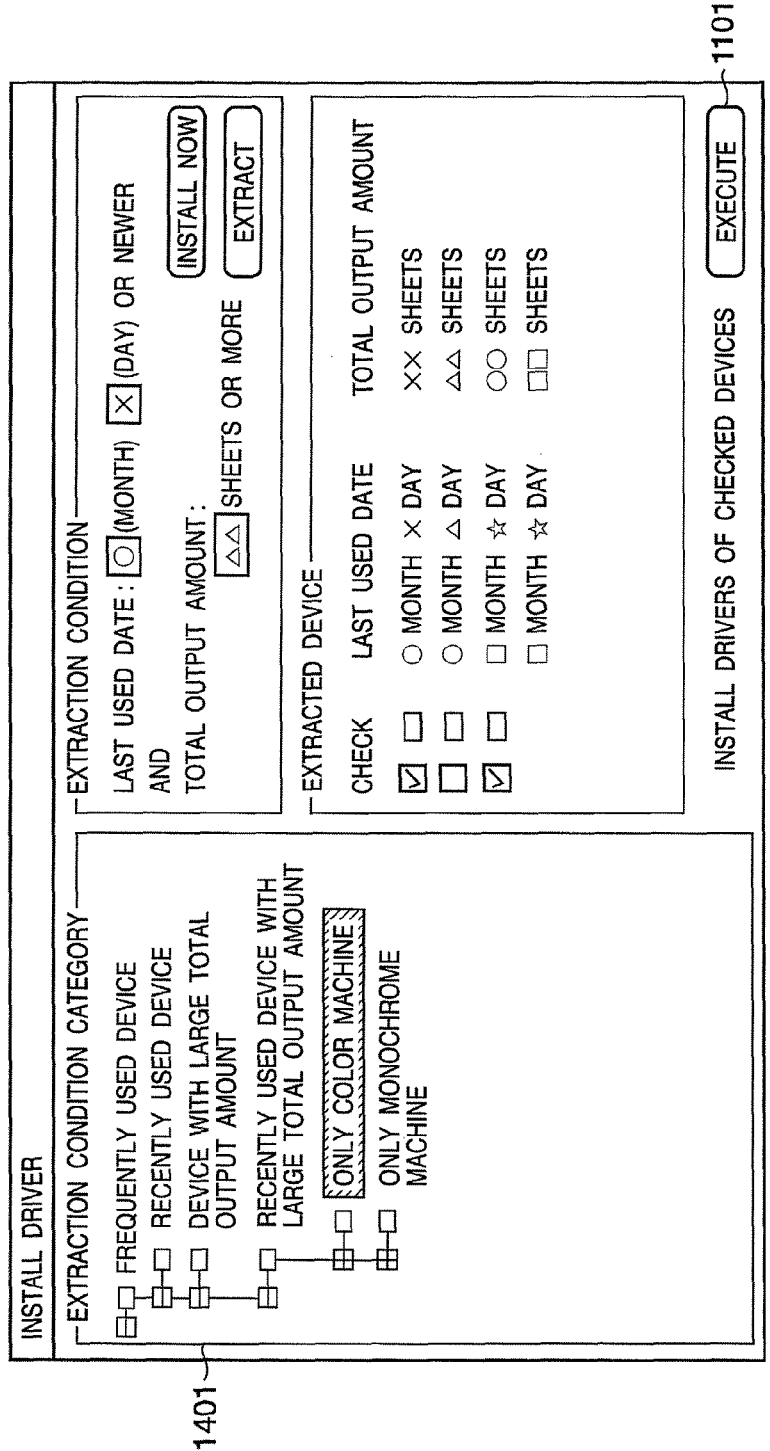
FIG. 14 shows a window display example when devices frequently used by the user are extracted with reference to the total numbers of printed sheets, and are displayed in correspondence with the capabilities of the devices.

FIG. 14 shows a window display example when device extraction is made for only color machines as targets. In this case, a layer under the respective options of an extraction condition category area 1401 further includes options of function selection. Therefore, in the sequence of FIG. 6, extraction conditions input in step S605 include designation of the function. In step S607, devices with the designated function are further extracted from those which are extracted under the conditions of the last use date, the total number of sheets to be output, and the like, thus generating device information. That is, in this embodiment, for example, when color is designated as an extraction condition, the function information of each device included in the device information extracted in step S607 in FIG. 6 is acquired. The device ID of the device which does not support color printing is deleted from the device information. That device information is transmitted to the client. Display of the "extracted device" area is the same as that in the first embodiment.

In this manner, the function can be designated as the extraction condition. For this reason, even when the user does not recognize the function of devices presented as candidates, a driver can be installed for a device with a desired function. For this reason, the driver can be installed in a short period time, thus reducing the user's labor.

Other Embodiments

In this embodiment, each device saves the output information. The output management unit acquires output information for each user from the device. However, device drivers corresponding to respective devices in the client may save output information. In this case, the output information is read out from the client PC. With this configuration, the present invention can be practiced to have a device driver as a configuration for recording output information even when device does not have any MIB.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-246426 filed on Aug. 26, 2005 which is hereby incorporated by reference herein in its entirety.

What is claimed is:

1. A device management system for communicating with a client computer, the system comprising:
   a processor programmed to execute:
   an output management task that manages output information of a plurality of devices for each user;
   an identification task that identifies a user who is about to install a driver;
   a device extraction task that extracts information of one or more devices to be used by the user identified by the identification task based on the output information; and
   a display control task that controls displaying of a window used to prompt the user to select a device or a device driver to be installed based on the information of the device extracted by the device extraction task.

2. The system according to claim 1, wherein the processor is further programmed to execute a transmission task that transmits driver information corresponding to the information of the device extracted by the device extraction task to the client computer.

3. The system according to claim 1, wherein:
   the output information includes information indicating the number of output sheets for each user by a printer device, and
   the device extraction task extracts a device with reference to the total number of output sheets to each device by the user.

4. The system according to claim 1, wherein:
   the output information includes information indicating a last use time for each user, and
   the device extraction task extracts a device with reference to the last use time of each device by the user.

5. The system according to claim 1, wherein the device extraction task further extracts a device based on the function of the device from devices extracted based on the output information.

6. The system according to claim 4, wherein the device extraction task extracts a device with reference to a color print function or being a multi-function device as the function of the device.

7. The system according to claim 1, wherein the identification task identifies the user who is about to install the driver using information input upon a login request of the user.

8. A method of communicating with a client computer for a device management system, the method comprising:
   an output management step of managing output information of a plurality of devices for each user;
   an identification step of identifying a user who is about to install a driver;
   a device extraction step of extracting information of one or more devices to be used by the user identified in the identification step based on the output information; and
   a display control step of displaying a window used to prompt the user to select a device or a device driver to be installed based on the information of the device extracted in the device extraction step.

9. The method according to claim 8, further comprising a transmission step of transmitting driver information corresponding to the information of the device extracted in the device extraction step to the client computer.

10. The method according to claim 8, wherein:
    the output information includes information indicating the number of output sheets for each user by a printer device, and
    the device extraction step extracts a device with reference to the total number of output sheets to each device by the user.

11. The method according to claim 8, wherein:
    the output information includes information indicating a last use time for each user, and
    the device extraction step extracts a device with reference to the last use time of each device by the user.

12. The method according to claim 8, wherein the device extraction step further extracts a device based on the function of the device from devices extracted based on the output information.

13. The method according to claim 11, wherein the device extraction step extracts a device with reference to a color print function or being a multi-function device as the function of the device.

14. The method according to claim 8, wherein the identification step identifies the user who is about to install the driver using information input upon a login request of the user.

15. A non-transitory computer-readable recording medium storing a computer program executable by a device management system to execute a method of communicating with a client computer, the method comprising:
    an output management step of managing output information of a plurality of devices for each user;
    an identification step of identifying a user who is about to install a driver;
    a device extraction step of extracting information of one or more devices to be used by the user identified in the identification step based on the output information; and
    a display control step of displaying a window used to prompt the user to select a device or a device driver to be installed based on the information of the device extracted in the device extraction step.

16. The non-transitory computer-readable recording medium according to claim 15, further comprising a transmission step of transmitting driver information corresponding to the information of the device extracted in the device extraction step to the client computer.

17. The non-transitory computer-readable recording medium according to claim 15, wherein:

the output information includes information indicating the number of output sheets for each user by a printer device, and the device extraction step extracts a device with reference to the total number of output sheets to each device by the user.

18. The non-transitory computer-readable recording medium method according to claim 15, wherein:

the output information includes information indicating a last use time for each user, and the device extraction step extracts a device with reference to the last use time of each device by the user.

19. The non-transitory computer-readable recording medium according to claim 15, wherein the device extraction step further extracts a device based on the function of the device from devices extracted based on the output information.

20. The non-transitory computer-readable recording medium according to claim 18, wherein the device extraction step extracts a device with reference to a color print function or being a multi-function device as the function of the device.

21. The non-transitory computer-readable recording medium according to claim 15, wherein the identification step identifies the user who is about to install the driver using information input upon a login request of the user.

* * * * *